United States Patent
Patel et al.

(10) Patent No.: US 11,563,898 B2
(45) Date of Patent: Jan. 24, 2023

(54) APPARATUS AND METHODS FOR GENERATING HIGH DYNAMIC RANGE MEDIA, BASED ON MULTI-STAGE COMPENSATION OF MOTION

(71) Applicant: SAMSUNG ELECTRONICS CO., LTD., Suwon-si (KR)

(72) Inventors: Mandakinee Singh Patel, Bangalore (IN); Green Rosh K S, Bangalore (IN); Anmol Biswas, Bangalore (IN); Bindigan Hariprasanna Pawan Prasad, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 17/275,422

(22) PCT Filed: Sep. 11, 2019

(86) PCT No.: PCT/KR2019/011884
§ 371 (c)(1),
(2) Date: Mar. 11, 2021

(87) PCT Pub. No.: WO2020/055196
PCT Pub. Date: Mar. 19, 2020

(65) Prior Publication Data
US 2022/0053117 A1    Feb. 17, 2022

(30) Foreign Application Priority Data

Sep. 11, 2018  (IN) .............................. 201841034147
Sep. 10, 2019  (IN) .............................. 201841034147

(51) Int. Cl.
*H04N 5/235* (2006.01)
*H04N 5/232* (2006.01)
*G06T 5/00* (2006.01)

(52) U.S. Cl.
CPC .......... *H04N 5/2355* (2013.01); *G06T 5/007* (2013.01); *H04N 5/2353* (2013.01); *H04N 5/23254* (2013.01)

(58) Field of Classification Search
CPC ............. H04N 5/2355; H04N 5/23254; H04N 5/2353; G06T 5/007; G06T 2207/10144;
(Continued)

(56) References Cited

U.S. PATENT DOCUMENTS 7,142,723 B2   11/2006   Kang et al.
8,269,843 B2    9/2012   Luo et al.
(Continued)

FOREIGN PATENT DOCUMENTS

CN    105931213 A    9/2016
KR    10-1026585 B1   4/2011
KR    10-1699919 B1   1/2017

OTHER PUBLICATIONS

Zhang, "Vivo's AI-Powered 'Super HDR' Blends 12 Separate Exposures," https://petapixel.com/2018/03/22/vivos-ai-poweredsuper-hdr-blends-12-separate-exposures/, Mar. 2018, Total 10 pages.
(Continued)

*Primary Examiner* — Gevell V Selby
(74) *Attorney, Agent, or Firm* — Sughrue Mion, PLLC

(57) ABSTRACT

Apparatus and methods for generating High Dynamic Range (HDR) media, based on multi-stage compensation of motion in a captured scene is disclosed in the embodiments herein. Embodiments herein relates to the field of image processing devices suitable for processing two or more images of different exposures and more particularly to apparatus and methods for generating a High Dynamic Range (HDR) media, based on a multi-stage compensation of motion in a captured scene. The apparatus is configured to correct exposure alignment error and media registration error from a
(Continued)

registered plurality of media frames comprising a plurality of exposure levels corresponding to the captured scene. The apparatus is configured to remove a plurality of false ghost artefacts in the plurality of media frames. The apparatus is configured to generate the HDR media, based on a generated ghost map.

15 Claims, 19 Drawing Sheets

(58) Field of Classification Search
CPC . G06T 2207/20208; G06T 2207/20221; G06T 7/30; G06T 5/50
See application file for complete search history.

(56) References Cited

U.S. PATENT DOCUMENTS

| | | |
|---|---|---|
| 8,525,900 B2 | 9/2013 | Garten |
| 8,989,484 B2 | 3/2015 | Moon et al. |
| 2005/0013501 A1 | 1/2005 | Kang et al. |
| 2012/0236169 A1 | 9/2012 | Oh et al. |
| 2012/0287294 A1 | 11/2012 | Kaizu et al. |
| 2013/0028509 A1 | 1/2013 | Moon et al. |
| 2013/0100314 A1 | 4/2013 | Li et al. |
| 2015/0249779 A1* | 9/2015 | Vidal-Naquet ........ H04N 5/235 348/229.1 |
| 2017/0230562 A1* | 8/2017 | Gupta ................. H04N 5/2355 |
| 2021/0042941 A1* | 2/2021 | Zhen ................... H04N 5/2355 |

OTHER PUBLICATIONS

Levoy, "HDR+: Low Light and High Dynamic Range photography in the Google Camera App," https://ai.googleblog.com/2014/10/hdr-low-light-andhigh-dynamic-range.html, Oct. 2014, Total 6 pages.

Wu et al., "Deep High Dynamic Range Imaging with Large Foreground Motions," Computer Vision Foundation, ECCV 2018 paper, Oct. 2018, Total 16 pages.

Hasinoff et al., "Burst photography for high dynamic range and low-light imaging on mobile cameras," ACM TOG, vol. 35, No. 6, Article 192, Nov. 2016, Total 12 pages.

Sen et al., "Robust Patch-Based HDR Reconstruction of Dynamic Scenes," ACM TOG, vol. 31, No. 6, Article 203, Nov. 2012, Total 11 pages.

Mangiat et al., "High Dynamic Range Video with Ghost Removal," Proceedings of SPIE, The International Society for Optical Engineering, Aug. 2010, Total 8 pages.

Wang et al., "An Exposure Fusion Approach without Ghost for Dynamic Scenes," IEEE, 2013 6th International Congress on Image and Signal Processing (CISP), Dec. 2013, Total 6 pages.

Kalantari et al., "Deep High Dynamic Range Imaging of Dynamic Scenes," ACM TOG, vol. 36, No. 4, Article 144, Jul. 2017, Total 12 pages.

International Search Report dated Dec. 24, 2019 issued by the International Searching Authority in counterpart International Application No. PCT/KR2019/011884 (PCT/ISA/210).

International Written Opinion dated Dec. 24, 2019 issued by the International Searching Authority in counterpart International Application No. PCT/KR2019/011884 (PCT/ISA/237).

Communication dated Oct. 1, 2021 issued by the European Patent Office in application No. 19860846.5.

* cited by examiner

Basis HDR Pipeline

Input Images | Registered Images | Exposure Aligned Images

Ghost Map after Ghost Modelling | Weight Map | Output after blending and contrast enhancement

APPARATUS AND METHODS FOR GENERATING HIGH DYNAMIC RANGE MEDIA, BASED ON MULTI-STAGE COMPENSATION OF MOTION

TECHNICAL FIELD

The present disclosure relates to the field of media processing devices suitable for processing two or more media of different exposures and more particularly to apparatus and methods for generating a High Dynamic Range (HDR) media, based on a multi-stage compensation of motion in a captured scene.

BACKGROUND ART

In general, even though a camera sensor provides 10 bit depth images, several operations within an Image Signal Processor (ISP) may restrict the 10 bit image to 8 bit depth image for saving power. Accordingly, computational imaging techniques may recover the lost information (i.e. reduced bits from 10 bit to 8 bit), by processing image to a multi-frame High Dynamic Range (HDR) image. Further, multiple image frames of different exposures are captured and blended together to form a single High Dynamic Range (HDR) image frame.

Currently, conventional methods may use short and long exposure image frames and, may significantly sacrifice parameters such as dynamic range, noise, and may also suffer from artefacts such as halos. Further, moving objects within the scene may have effects in image quality during multi exposure fusion. Accordingly, if, multi exposure fusion is not rightly handled, then it may cause significant artefacts known as ghosts. Furthermore, the ghosting may increase with the number of image frames used for blending. Increasing the number of image frames for blending may improve dynamic range and noise based on extreme ghosting of the image.

Further, conventional methods disclose about image sensors that can be used to capture images having rows of long exposure image pixel values that can be interleaved with rows of short exposure image pixel values. A combined long exposure image and a combined short exposure image may be generated using the long exposure and the short exposure values from an interleaved image frames and the interpolated values from a selected one of the interleaved image frames. Further, the High Dynamic Range (HDR) images may be generated using the combined long exposure and short exposure images.

In yet another conventional method, apparatus for obtaining a motion adaptive High Dynamic Range (HDR) image may be disclosed. Further, a motion degree of a first image and a second image taken using different exposure times may be calculated and the motion calculation intensity may be adjusted based on the calculated motion degree. The motion compensation intensity involves global motion compensation and/or location motion compensation. The images subjected to compensation may be synthesized and output, so that the image having High Dynamic Range (HDR) may be obtained.

Further, conventional methods disclose a process for generating the high dynamic range (HDR) image from a bracketed image sequence, even in the presence of scene or camera motion. Further, a reference image and warped image(s) may be combined to create a radiance map representing the HDR image.

Additionally, the amount of ghosting may increase with number of input image frames. The halos in the HDR image may increase due to increased exposure variance between input image frames. Further, the global reference frame selection can introduce large amount of ghosting and halos. Accordingly, a ghost map comprises of three entities such as true ghosts caused due to local object motion, false ghosts caused due to improper image registration, and false ghosts caused due to improper exposure alignment. The conventional methods may consider the three entities together thereby, degrading final output image quality. The complexity of simultaneous correction of ghosts and halos may increase exponentially as the number of image frames increases. Further, de-ghosting methods may estimate a ghost map by first aligning the exposures of input images followed by a photometric difference. The conventional exposure alignment method may not be able to handle very bright and dark regions of the image that may result in false ghosts (i.e. regions detected erroneously as ghosts), which can in turn lead to reduced dynamic range in the output image.

FIGS. 1$a$ and 1$b$ illustrates a schematic diagram of an example scenario, where darker and saturated regions in a HDR image are reproduced with less detail using conventional method. As depicted in FIG. 1$b$, the darker regions and the saturated regions are not reproduced with increased exposure and saturation. Further, the conventional methods may require more time to capture image frames of the scene. Further, as depicted in FIG. 1$b$, the ghost artefacts in the saturated region of the captured image are not rectified or removed in the HDR image.

Hence, the conventional methods may not disclose methods to handle plurality of parameters such as noise, halos, dynamic range and ghosting in for generating High Dynamic Range (HDR) media.

DISCLOSURE OF INVENTION

Technical Problem

The principal object of the embodiments herein is to disclose apparatus and methods for generating a High Dynamic Range (HDR) media, based on a multi-stage compensation of motion in a captured scene.

Another object of the embodiments herein is to disclose apparatus and methods for handling large number of input media with minimal Image Quality (IQ) tuning.

Another object of the embodiments herein is to disclose apparatus and methods for ghost modeling of media to model improper exposure alignment and image registration errors for avoiding false ghosts.

Another object of the embodiments herein is to disclose apparatus and methods for enhancing dynamic range of the media, particularly in saturated and dark regions of the scene.

Solution to Problem

Accordingly, the embodiments herein provide an apparatus for generating a High Dynamic Range (HDR) media. The apparatus is configured to align exposure of a plurality of media frames with a high exposure (Ih) level to a low exposure (Il) level, by selecting from a registered plurality of media frames comprising a plurality of exposure levels corresponding to the captured scene. The apparatus is configured to generate a first ghost map, based on the generated photometric difference map of the aligned plurality of media frames to the low exposure ($I_l$) level. The apparatus is configured to correct an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level. The apparatus is configured to correct a media registration error of the aligned at least one of the high exposure level and the low exposure level of the registered plurality of the media frames comprising the plurality of exposure levels. The apparatus is configured to remove a plurality of false ghost artefacts in the at least one of, the corrected exposure alignment error the corrected media registration error, and the first ghost map, corresponding to the registered plurality of media frames, by using the first ghost map and the second photometric difference map. The apparatus is configured to generate a second ghost map using the generated first ghost map, based on removing the plurality of false ghost artefacts. The apparatus is configured to generate the HDR media, based on the generated second ghost map, wherein the HDR media is generated based on generating a weight map corresponding to the second ghost map associated with the corrected plurality of media frames and blending at least two corrected media frames using the weight maps.

Accordingly, the embodiments herein provide a method for generating a High Dynamic Range (HDR) media. The method includes aligning an exposure of a plurality of media frames with a high exposure ($I_h$) level to a low exposure ($I_l$) level, by selecting from a registered plurality of media frames comprising a plurality of exposure levels corresponding to the captured scene. The method includes generating a first ghost map, based on the generated photometric difference map of the aligned plurality of media frames to the low exposure ($I_l$) level. The method includes correcting, by the processor, an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level. The method includes correcting a media registration error of the aligned at least one of the high exposure level and the low exposure level of the registered plurality of the media frames comprising the plurality of exposure levels. The method includes removing a plurality of false ghost artefacts in the at least one of, the corrected exposure alignment error the corrected media registration error, and the first ghost map, corresponding to the registered plurality of media frames, by using the first ghost map and the second photometric difference map. The method includes generating a second ghost map using the generated first ghost map, based on removing the plurality of false ghost artefacts. The method includes generating the HDR media, based on the generated second ghost map, wherein the HDR media is generated based on generating a weight map corresponding to the second ghost map associated with the corrected plurality of media frames and blending at least two corrected media frames using the weight maps.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Advantageous Effects of Invention

The object of the embodiments herein is to disclose apparatus and methods for handling large number of input media with minimal Image Quality (IQ) tuning.

Another object of the embodiments herein is to disclose apparatus and methods for ghost modeling of media to model improper exposure alignment and image registration errors for avoiding false ghosts.

Another object of the embodiments herein is to disclose apparatus and methods for enhancing dynamic range of the media, particularly in saturated and dark regions of the scene.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

MODE FOR THE INVENTION

Figure 1A:
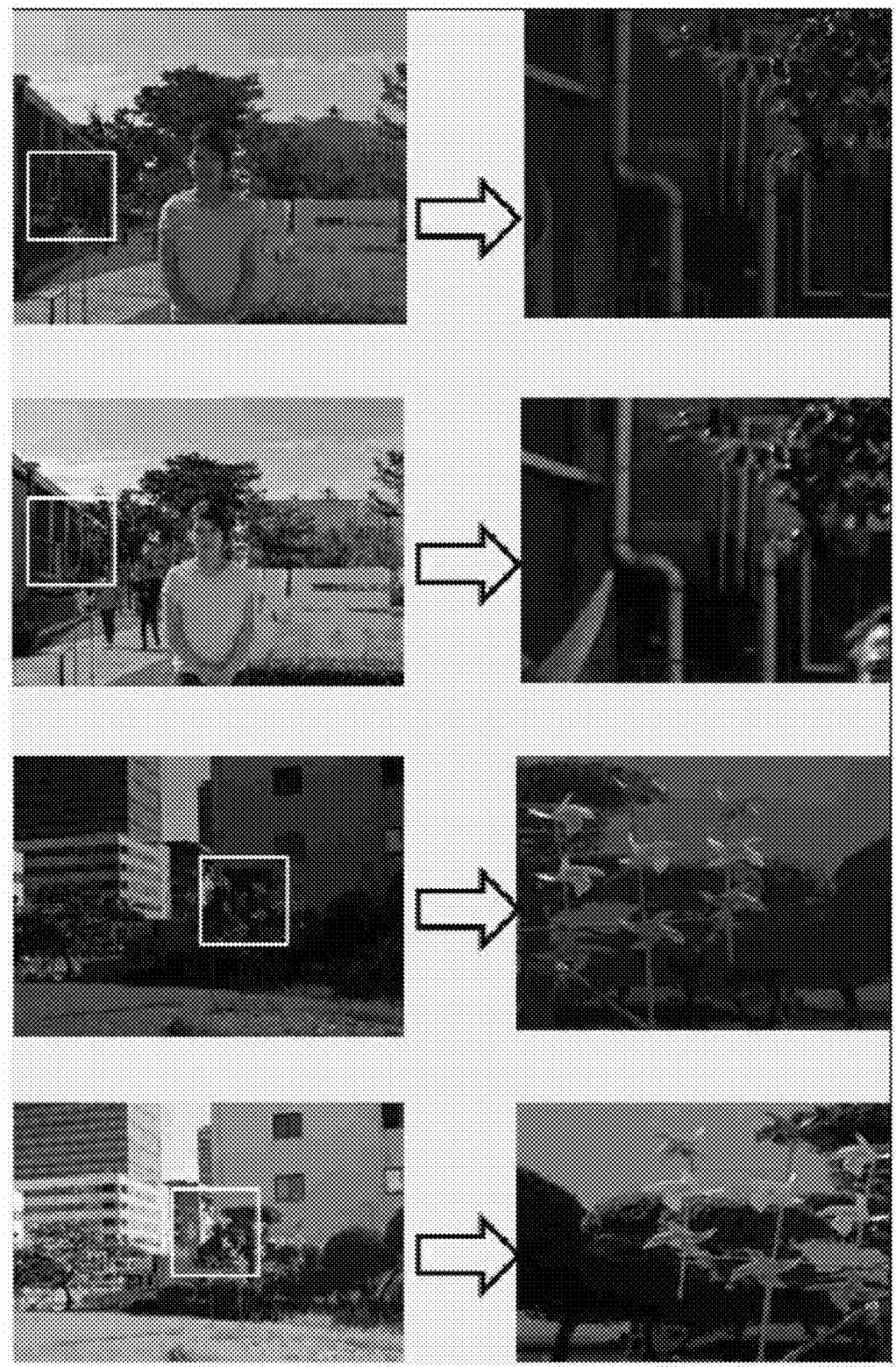
FIGS. 1a and 1b illustrates a schematic diagram of an example scenario, where darker and saturated regions in a HDR image are reproduced with less detail using conventional methods.
Figure 1B:
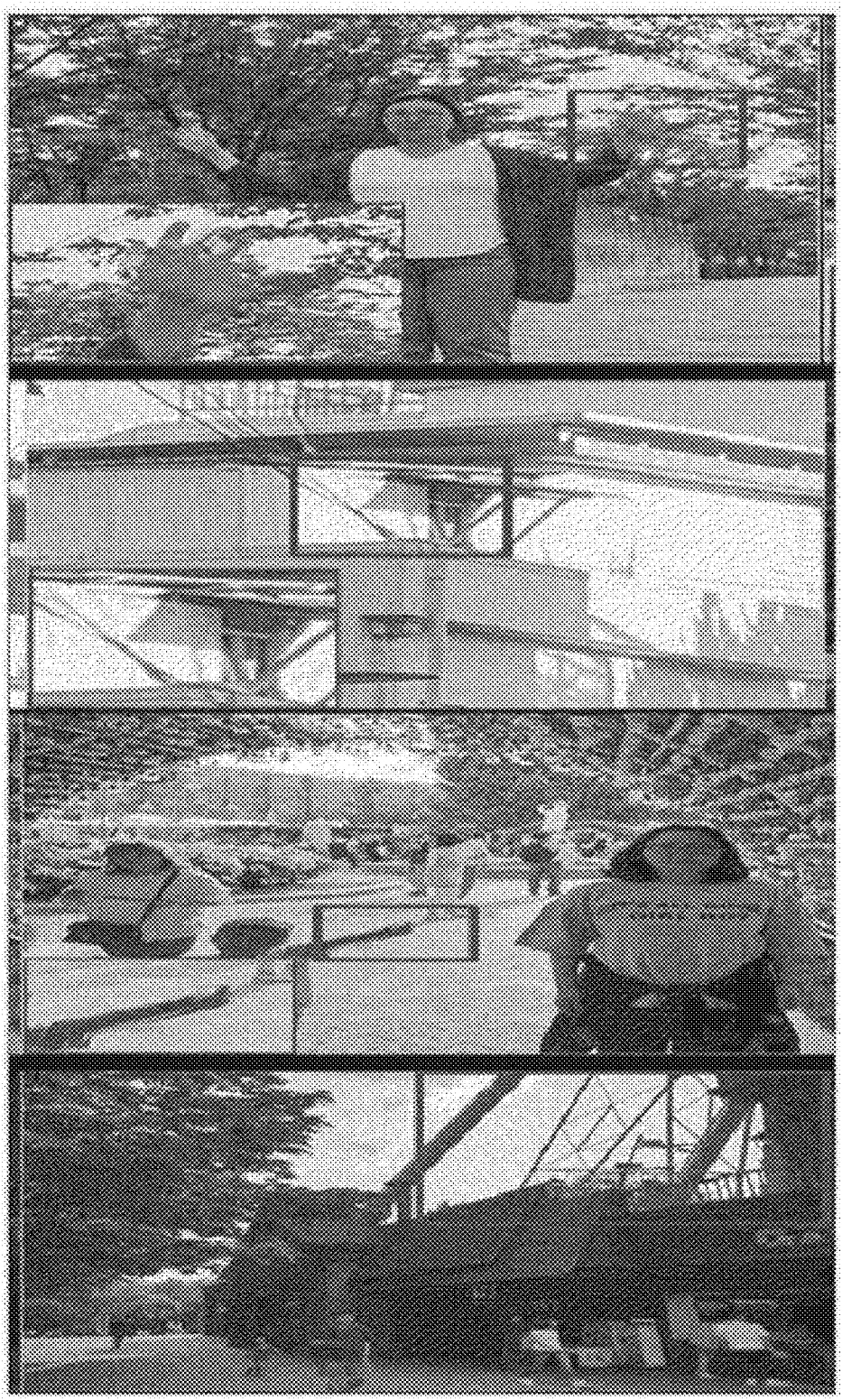

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve apparatus and methods for generating a High Dynamic Range (HDR) media, based on multi-stage compensation of motion in a captured scene. Referring now to the drawings, and more particularly to FIGS. 2 through 11d, where similar reference characters denote corresponding features consistently throughout the figures, there are shown example embodiments.

Figure 2:
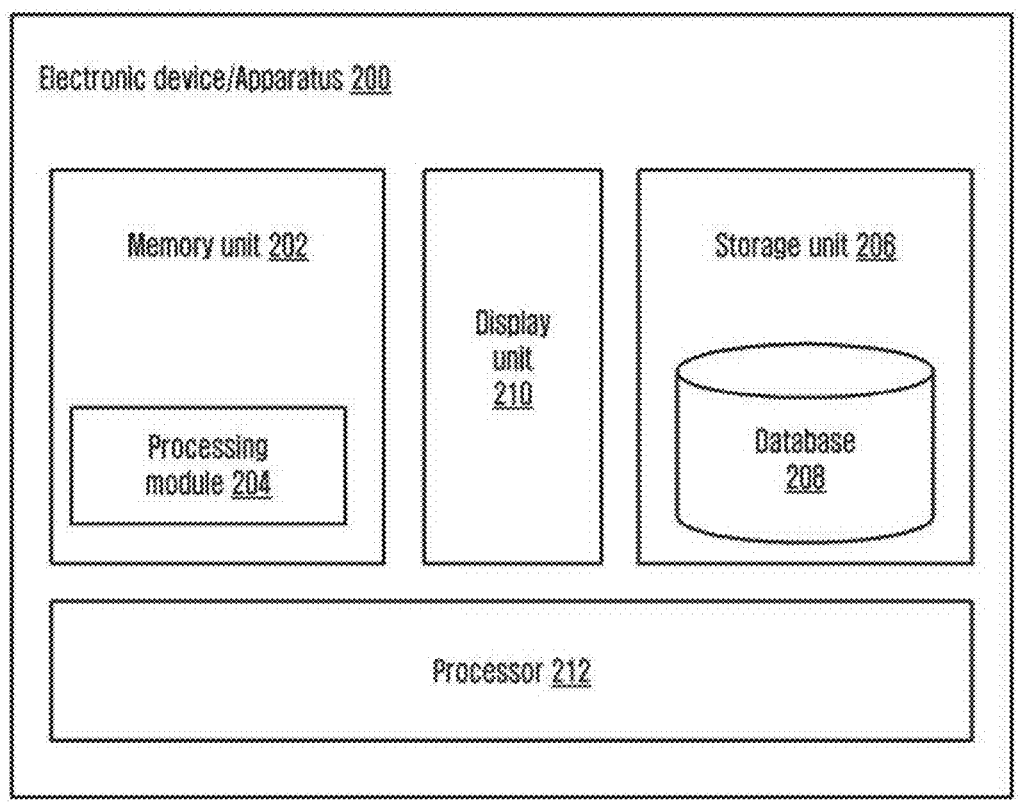
FIG. 2 illustrates a block diagram of apparatus for generating a High Dynamic Range (HDR) media, based on a multi-stage compensation of motion in a captured scene, according to embodiments as disclosed herein.

FIG. 2 illustrates a block diagram of apparatus 200 for generating a High Dynamic Range (HDR) media, based on a multi-stage compensation of motion in a captured scene, according to embodiments as disclosed herein.

The apparatus 200 includes a memory unit 202, a storage unit 206, a database 208, a display unit 210, and a processor 212. Further, the apparatus 200 further includes a processing module 204, residing in the memory unit 202. The apparatus 200 can also be referred herein after as an electronic device 200. When the machine readable instructions are executed by the processing module 204, the processing module 204 causes the electronic device 200 to acquire data associated with the electronic device 200 commissioned in the computing environment. Further, the processing module 204 causes the electronic device 200 to generate a High Dynamic Range (HDR) media, based on multi-stage compensation of motion in a captured scene.

Examples of the apparatus 200/electronic device 200 can be at least one of, but not limited to, a mobile phone, a smart phone, a tablet, a handheld device, a phablet, a laptop, a computer, a wearable computing device, a server, an Internet of Things (IoT) device, a vehicle infotainment system, a camera, a web camera, a digital single-lens reflex (DSLR) camera, a video camera, a digital camera, a mirror-less camera, a still camera, or any other device that comprises at least one camera. The apparatus 200 may comprise other components such as input/output interface(s), communication interface(s) and so on (not shown). The apparatus 200 may comprise a user application interface (not shown) and an application management framework (not shown) and an application framework (not shown) for generating a High Dynamic Range (HDR) media, based on a multi-stage compensation of motion in a captured scene. The application framework can be a software library that provides a fundamental structure to support the development of applications for a specific environment. The application framework may also be used in developing graphical user interface (GUI) and web-based applications. Further, an application management framework may be responsible for the management and maintenance of the application and definition of the data structures used in databases and data files.

The apparatus 200 can operate as a standalone device or as a connected (e.g., networked) device that connects to other computer systems/devices over a wired or wireless communication network. Further, the methods and apparatus described herein may be implemented on different computing devices that comprise at least one camera.

The apparatus 200 may detect/identify a scene and capture a plurality of frames. The optical media comprising the captured plurality of frames is converted into an electric signal. The structure of the apparatus 200 may include an optical system (i.e. lens or image sensor), a photoelectric conversion system (i.e. charged couple device (CCD), camera tube sensors, and so on.) and a circuitry (such as a video processing circuit). The image sensor may output a Lux (Lux) value, which is a unit of illumination reflected light intensity. Further, a color difference signal (U, V) may include two colors such as hue and saturation, and represented by Cr and Cb. Cr reflects the difference between the red parts of the RGB signal values of RGB input luminance signal. Cb signal reflects the blue part of the RGB input with the RGB values of the luminance difference signal. In an example, the apparatus 200 may include a dual camera that may comprise two different image sensors such as at least one of, but not limited to, a Charge-Coupled Devices (CCD) sensor, an active pixel sensor, a Complementary Metal-Oxide-Semiconductor (CMOS) sensor, a N-type Metal-Oxide-Semiconductor (NMOS, Live MOS) sensor, a bayer filter sensor, a quadra sensor, a tetra sensor, a Foveon sensor, a 3CCD sensor, a RGB (Red Green Blue) sensor, and so on.

Further, the image sensor may capture still image snapshots and/or video sequences. Also, each image sensor may include color filter arrays (CFAs) arranged on a surface of individual sensors or sensor elements. The image sensors may be arranged in line, a triangle, a circle or another pattern. The apparatus 200 may activate certain sensors and deactivate other sensors without moving any sensor. The camera residing in the apparatus 200 may include functions such as automatic focus (autofocus or AF), automatic white balance (AWB), and automatic exposure control (AEC) to produce pictures or video that are in focus, spectrally balanced, and exposed properly. AWB, AEC and AF are sometimes referred to herein as 3A convergence. An optimal exposure period may be estimated using a light meter (not shown), and/or capturing one or more images by the image sensor.

In an embodiment, the apparatus 200 is configured to align exposure of a plurality of media frames with a high exposure ($I_h$) level to a low exposure ($I_l$) level, by selecting from a registered plurality of media frames comprising a plurality of exposure levels corresponding to the captured scene. The exposures are aligned using a pixel based intensity correspondence method such as at least one of, but not limited to, a polynomial curve fitting, a histogram matching and so on, between high exposure image and low exposure image. In an embodiment, the registered plurality of media frames aligned to the low exposure ($I_l$) level is compared with a media frame of low exposure ($I_l$) level of a non-registered plurality of media frames comprising the plurality of exposure levels, to generate a first photometric difference map. The comparison with a media frame of low exposure ($I_l$) level is performed by taking a per pixel intensity difference between two images, in turn the photometric difference map is generated.

In an embodiment, the apparatus 200 is configured to generate a first ghost map, based on the generated photometric difference map of the aligned plurality of media frames to the low exposure ($I_l$) level. The generated first ghost map is similar to the photometric difference map between two images. In an embodiment, the apparatus 200 is configured to correct an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level. The first ghost map is the difference between exposure aligned image and original image. For example, if, there is an error in the exposure alignment, then the difference/error is depicted as a ghost. However, the performed exposure alignment is not according to the reality and it can be an error (false ghost) in reality. Accordingly, the error may need to be corrected.

In an embodiment, the registered plurality of media frames aligned back to the low exposure ($I_l$) level is compared with the media frame of low exposure ($I_l$) level of the non-registered plurality of media frames comprising the plurality of exposure levels, to generate a second photometric difference map. The generated second photometric difference map includes generating the error due to photometric alignment. In an embodiment, the apparatus 200 is configured to correct a media registration error of the aligned at least one of the high exposure level and the low exposure level of the registered plurality of the media frames comprising the plurality of exposure levels. The media registration error is corrected by first generating edge maps of the registered inputs using methods such as canny edge detector and then taking a photometric difference between the edge maps. This map is the error due to media registration.

In an embodiment, the apparatus 200 is configured to remove a plurality of false ghost artefacts in the at least one of, the corrected exposure alignment error, the corrected media registration error, and the first ghost map, corresponding to the registered plurality of media frames, by using the first ghost map and the second photometric difference map. In an embodiment, the apparatus 200 is configured to generate a second ghost map using the generated first ghost map, based on removing the plurality of false ghost artefacts. The plurality of false ghost artefacts is removed to set the pixels detected as false ghosts to zero, in turn effectively removing the false ghosts.

In an embodiment, the apparatus 200 is configured to generate the HDR media, based on the generated second ghost map, wherein the HDR media is generated based on generating a weight map corresponding to the second ghost map associated with the corrected plurality of media frames and blending at least two corrected media frames using the weight maps. In an embodiment, the weight map is a function of input image pixel intensities as well as second ghost map. The weight map may be suppressed depending on the value of ghost map, so that image blending does not take place in regions with motion so that there is no ghost in the final image.

In an embodiment, the exposure alignment of the media frame is performed by using histogram matching method. In an embodiment, aligning the exposure of the plurality of media frames with the high exposure ($I_h$) level to the low exposure ($I_l$) level is performed by polynomial fitting method. In an embodiment, correcting the media registration error comprises analyzing an edge information of the aligned at least one of the high exposure level and the low exposure level of the registered plurality of the media frames.

In an embodiment, the apparatus 200 is configured to estimate high frequency noise present in the registered plurality of media frames after removing the false ghost artefacts. In an embodiment, the apparatus 200 is configured to enhance the registered plurality of media frames after removing the high frequency noise, to generate the second ghost map, by applying a morphological operation. The morphological operation includes erosion for removing unwanted pixels and dilation to fill holes in the ghost map. In an embodiment, the apparatus 200 is configured to identify contribution of pixels in the enhanced plurality of media frames by estimating the weight map using a predefined lookup table and the generated second ghost map. The weight map can be a function of input image intensity and ghost map. The function is pre-determined as a look-up-table of pixel intensity values. In an embodiment, the weight maps are used to blend at least two corrected media frames. In an embodiment, the apparatus 200 is configured to enhance contrast of the blended media frames by adjusting a media curve to a higher dynamic range.

In an embodiment, the apparatus 200 is configured to provide a first set of consecutive exposure frames of the non-registered plurality of media frames, to generate a first set of intermediate media frames from a plurality of first stage basis HDR modules, for processing the HDR media. In an embodiment, the apparatus 200 is configured to provide the first set of intermediate media frames from the plurality of first stage basis HDR modules to a plurality of second stage basis HDR modules to generate a second set of intermediate media frames. In an embodiment, the apparatus 200 is configured to provide iteratively the intermediate media frames from the first stage basis HDR modules to the (N−1)th stage basis HDR modules to generate HDR media. In an embodiment, the basis HDR modules are connected each other in series, to operate on media frames that are captured consecutively, to remove ghost and halo artefacts. In an embodiment, the basis HDR modules comprise enhancing dynamic rage of the media frames in multiple stage basis HDR modules. In an embodiment, the basis HDR modules comprises tone mapping of the final HDR media suitable for display and image compression stage.

In an embodiment, the apparatus 200 is configured to boost exposure of the plurality of media frames with low exposure ($I_l$) level to obtain aligned exposure ($I'_l$) level. In an embodiment, the apparatus 200 is configured to suppress exposure of the plurality of media frames with aligned exposure ($I'_l$) level to obtain suppressed exposure ($I''_l$) level. In an embodiment, the apparatus 200 is configured to estimate exposure alignment error by determining difference between media frames with low exposure ($I_l$) level and suppressed exposure ($I''_l$) level, as $|I_l - I''_l|$.

FIG. 2 illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Figure 3:
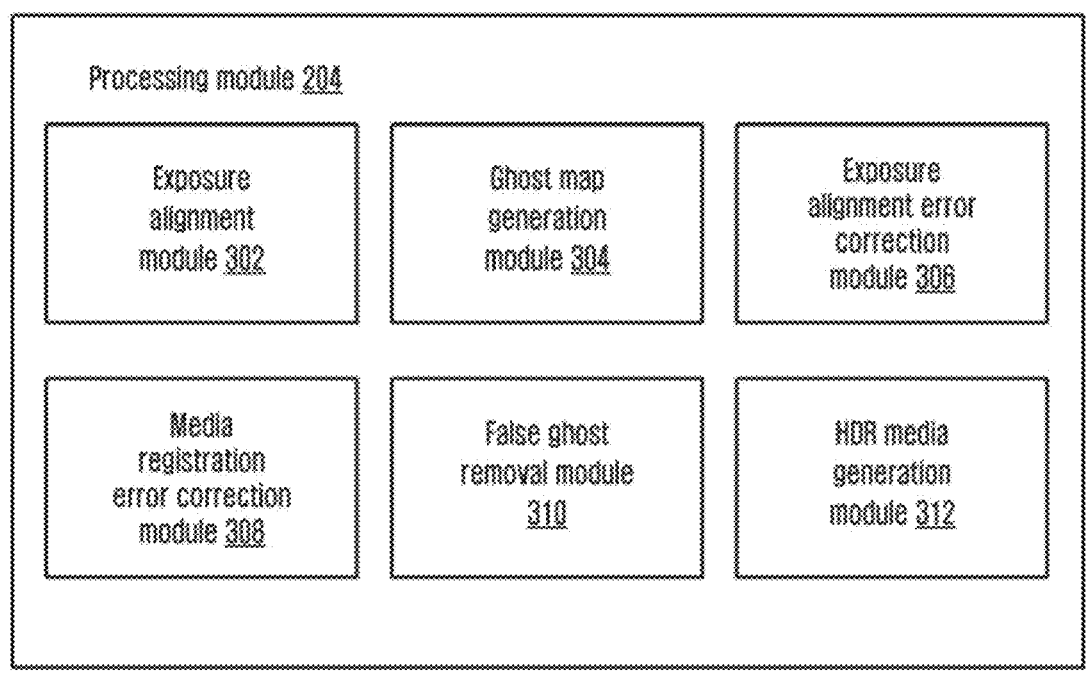
FIG. 3 illustrates a detailed view of a processing module as shown in FIG. 2, comprising various modules, according to embodiments as disclosed herein.

FIG. 3 illustrates a detailed view of a processing module as shown in FIG. 2, comprising various modules, according to embodiments as disclosed herein.

In an embodiment, the apparatus 200 may comprise a processing module 204 stored in the memory unit 202 (depicted in FIG. 2). The processing module 204 may comprise a plurality of sub modules. The plurality of sub modules can comprise of, an exposure alignment module 302, a ghost map generation module 304, an exposure alignment error correction module 306, a media registration error correction module 308, a false ghost removal module 310, and a HDR media generation module 312.

In an embodiment, the exposure alignment module 302 is configured to align exposure of a plurality of media frames with a high exposure ($I_h$) level to a low exposure ($I_l$) level, by selecting from a registered plurality of media frames comprising a plurality of exposure levels corresponding to the captured scene. In an embodiment herein, the plurality of exposure levels corresponding to the captured scene can be consecutive exposure levels. In an embodiment herein, the plurality of exposure levels corresponding to the captured scene can be non-consecutive exposure levels. In an embodiment, the registered plurality of media frames aligned to the low exposure ($I_l$) level is compared with a media frame of low exposure ($I_l$) level of a non-registered plurality of media frames comprising the plurality of exposure levels, to generate a first photometric difference map. In an embodiment, the ghost map generation module 304 is configured to generate a first ghost map, based on the generated photometric difference map of the aligned plurality of media frames to the low exposure ($I_l$) level. In an embodiment, the exposure alignment error correction module 306 is configured to correct an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level. In an embodiment, the registered plurality of media frames aligned back to the low exposure ($I_l$) level is compared with the media frame of low exposure ($I_l$) level of the non-registered plurality of media frames comprising the plurality of exposure levels, to generate a second photometric difference map.

In an embodiment, the registration error correction module 308 is configured to correct a media registration error of the aligned at least one of the high exposure level and the low exposure level of the registered plurality of the media frames comprising the plurality of exposure levels. In an embodiment, the false ghost removal module 310 is configured to remove a plurality of false ghost artefacts in the at least one of, the corrected exposure alignment error of the corrected media registration error, and the first ghost map, corresponding to the registered plurality of media frames, by using the first ghost map and the second photometric difference map. In an embodiment, the ghost map generation module 304 is configured to generate a second ghost map using the generated first ghost map, based on removing the plurality of false ghost artefacts. In an embodiment, the HDR media generation module 312 is configured to generate the HDR media, based on the generated second ghost map. In an embodiment, the HDR media is generated based on generating a weight map corresponding to the second ghost map associated with the corrected plurality of media frames and blending at least two corrected media frames using the weight maps.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

Figure 4:
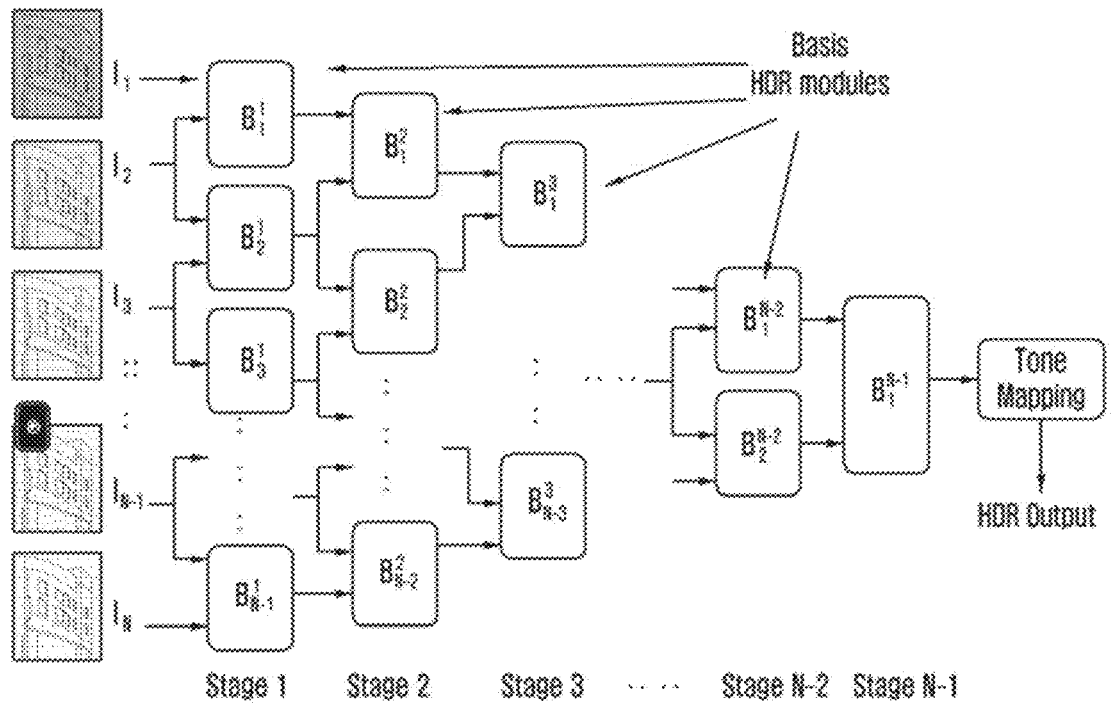
FIG. 4 illustrates a block diagram of basis HDR modules for generating multi-stage motion compensated High Dynamic Range (HDR) media, according to embodiments as disclosed herein.
Figure 4:
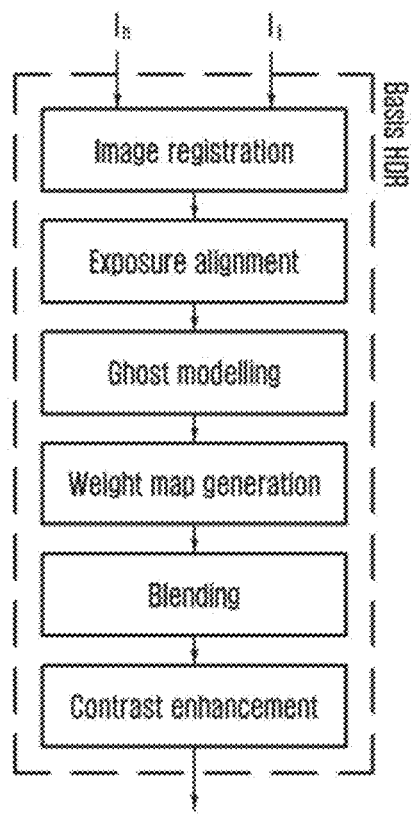

FIG. 4 illustrates a block diagram of basis HDR modules for generating multi-stage motion compensated High Dynamic Range (HDR) media, according to embodiments as disclosed herein.

In an embodiment, a first set of consecutive exposure frames of the non-registered plurality of media frames is used, to generate a first set of intermediate media frames from a plurality of first stage basis HDR modules, for processing the HDR media. In an embodiment, the first set of intermediate media frames is provided by the plurality of first stage basis HDR modules to a plurality of second stage basis HDR modules to generate a second set of intermediate media frames. In an embodiment, the intermediate media frames from the first stage basis HDR modules are used iteratively to (N−1)th stage basis HDR modules to generate HDR media. In an embodiment, tone mapping is performed to convert the final HDR media output from the (N−1)th stage, to a form that may be suitable for displaying on the display unit 210 of the electronic device 200 or for image compression scenario in the electronic device 200.

Figure 5:
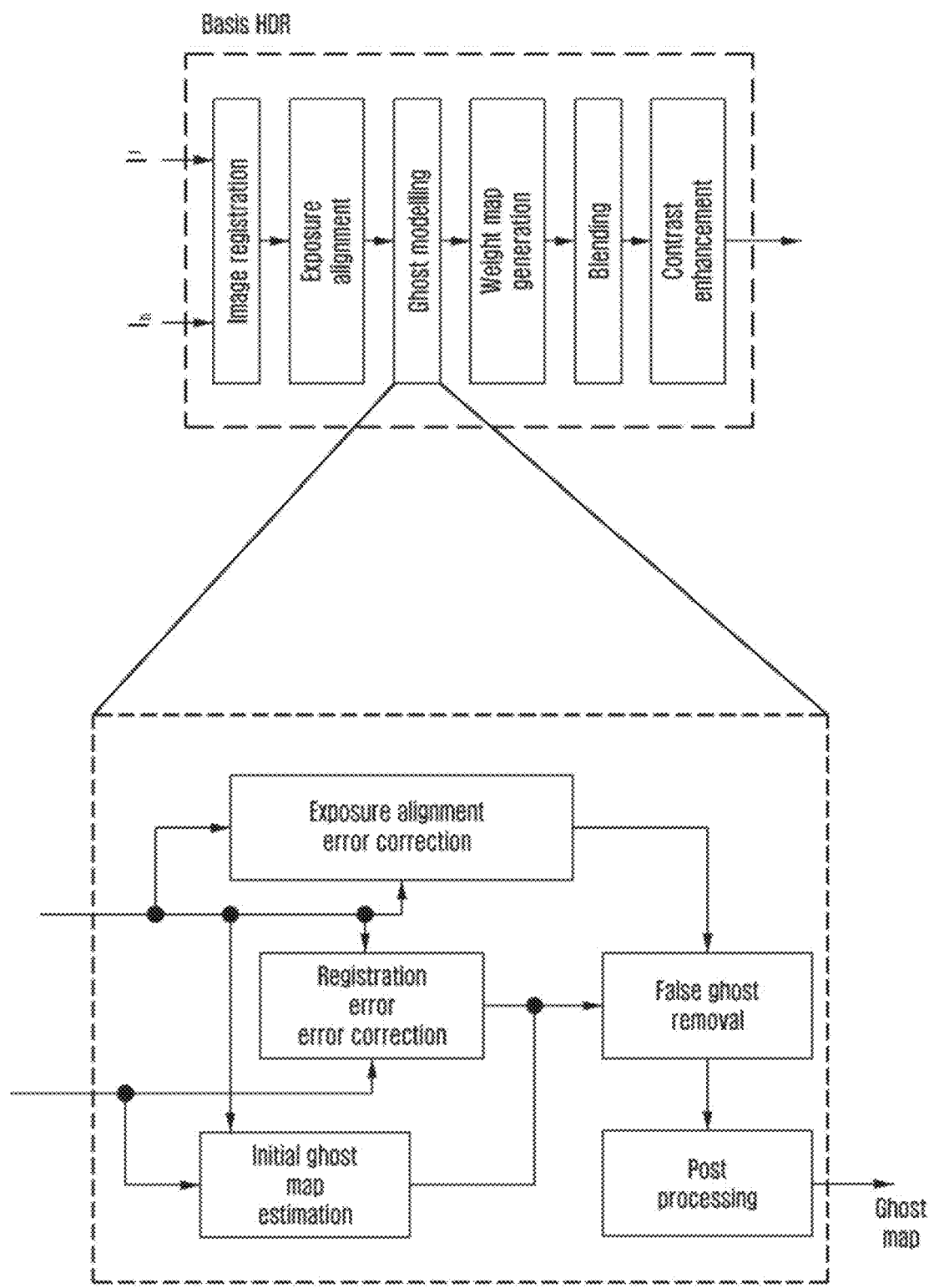
FIG. 5 illustrates a detailed view of a ghost modeling as shown in FIG. 4, comprising various modules, according to embodiments as disclosed herein.

FIG. 5 illustrates a detailed view of a ghost modeling as shown in FIG. 4, comprising various modules, according to embodiments as disclosed herein.

The apparatus 200 is configured to perform high quality ghost modeling within each basis HDR module. In an embodiment, the apparatus is configured to perform forward exposure alignment and backward exposure alignment of consecutive exposure media frames for estimation of an exposure alignment error. In an embodiment, the apparatus is configured to compute a first ghost map from the exposure aligned media frame and a captured media frame. In an embodiment, the apparatus is configured to compute edge information for estimation of a media registration error. In an embodiment, the apparatus is configured to estimate of the exposure alignment error and the media registration error using the computed edge information and the exposure aligned media frames. In an embodiment, the apparatus is configured to generate a second ghost map using an estimated first ghost map and the false ghost artefacts based on estimation of a high frequency noise and false ghosts in the estimated media frame.

Figure 6:
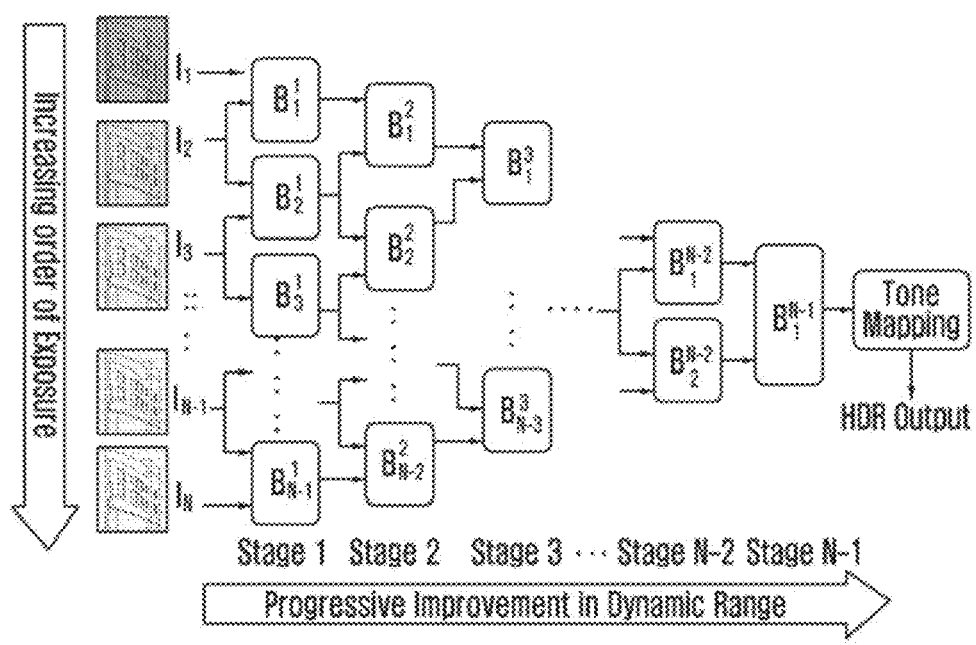
FIG. 6 illustrates a scalable architecture for generating multi-stage motion compensated High Dynamic Range (HDR) media, according to embodiments as disclosed herein.

FIG. 6 illustrates a scalable architecture for generating multi-stage motion compensated High Dynamic Range (HDR) media, according to embodiments as disclosed herein.

Embodiments herein comprise basis-HDR modules, which takes a plurality of input exposures and provides intermediate outputs. The multi-frame HDR media processing may be expediently divided into multiple stages that may have multiple basis HDR modules/blocks. The multi-stage scalable architecture comprises of basis-HDR modules connected in such a way that each module operates on media frames that may be captured consecutively, to minimize the amount of ghosting and halos artefacts. Further, a progressive improvement in dynamic range over multiple stages is achieved. The common functionality of basis HDR may ensure scalability without the need for extensive IQ tuning.

Further, as depicted in FIG. 6, the image/media I1, I2, I3, up to IN, are consecutive exposure input image frames captured for HDR media generation. The '$B^k$', represents the basis HDR at '$k^{th}$' stage for exposure input image "I".

Figure 7A:
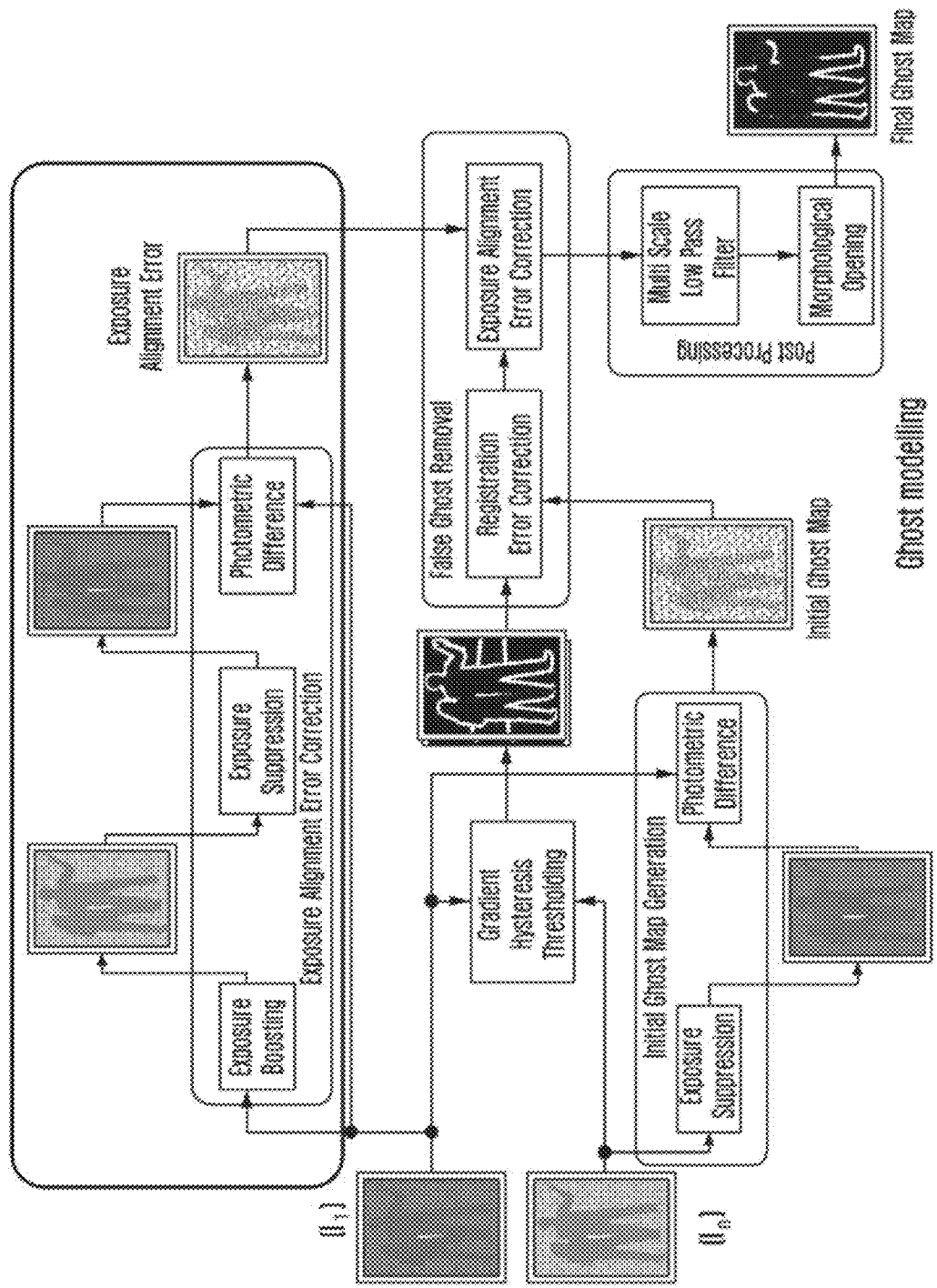
FIGS. 7a and 7b illustrates a schematic diagram for generating a ghost map and weight map respectively, according to embodiments as disclosed herein.
Figure 7B:
Figure 7B:

FIGS. 7a and 7b illustrates a schematic diagram for generating the ghost map and the weight map respectively, according to embodiments as disclosed herein.

Accordingly, the basis-HDR module may take a plurality of input exposures and comprises of plurality of image processing stages such as a registration stage, an exposure alignment stage, a ghost modeling stage, a weight map generation stage, a blending stage, and a contrast enhancement. Further, the multi stage HDR may use multiple modules/blocks of basis HDR in each stage. The basis HDR block may generate intermediate ghost-free and halo-free HDR output media/image frames. Each basis HDR block may handle only two image frames at once, providing better control over ghosts and halos artefacts.

Further, the exposure alignment error correction module 306 (as shown in FIG. 3) may model errors incurred due to any exposure alignment methods. The error estimation for an exposure boosting operation (exposure alignment from lower to higher exposure ($I_l \rightarrow I_h$)) may comprise an exposure boosting of $I_l$ to obtain $I'_l$, an exposure suppression of $I'_l$ to obtain $I''_l$, and an exposure alignment error can be estimated as $|I_l - I''_l|$. The error estimation for an exposure suppression operation can be performed vice-versa. The error estimation for the exposure suppression operation (i.e. exposure alignment from higher to lower exposure ($I_l \rightarrow I_h$)) may comprise an exposure suppression of $I_h$ to obtain $I'_h$, an exposure boosting of $I'_h$ to obtain $I''_h$, and an exposure alignment error can be estimated as $|I_h - I''_h|$. Further, histogram matching method may be used as the exposure alignment operator during exposure alignment of the media frames.

Figure 8:
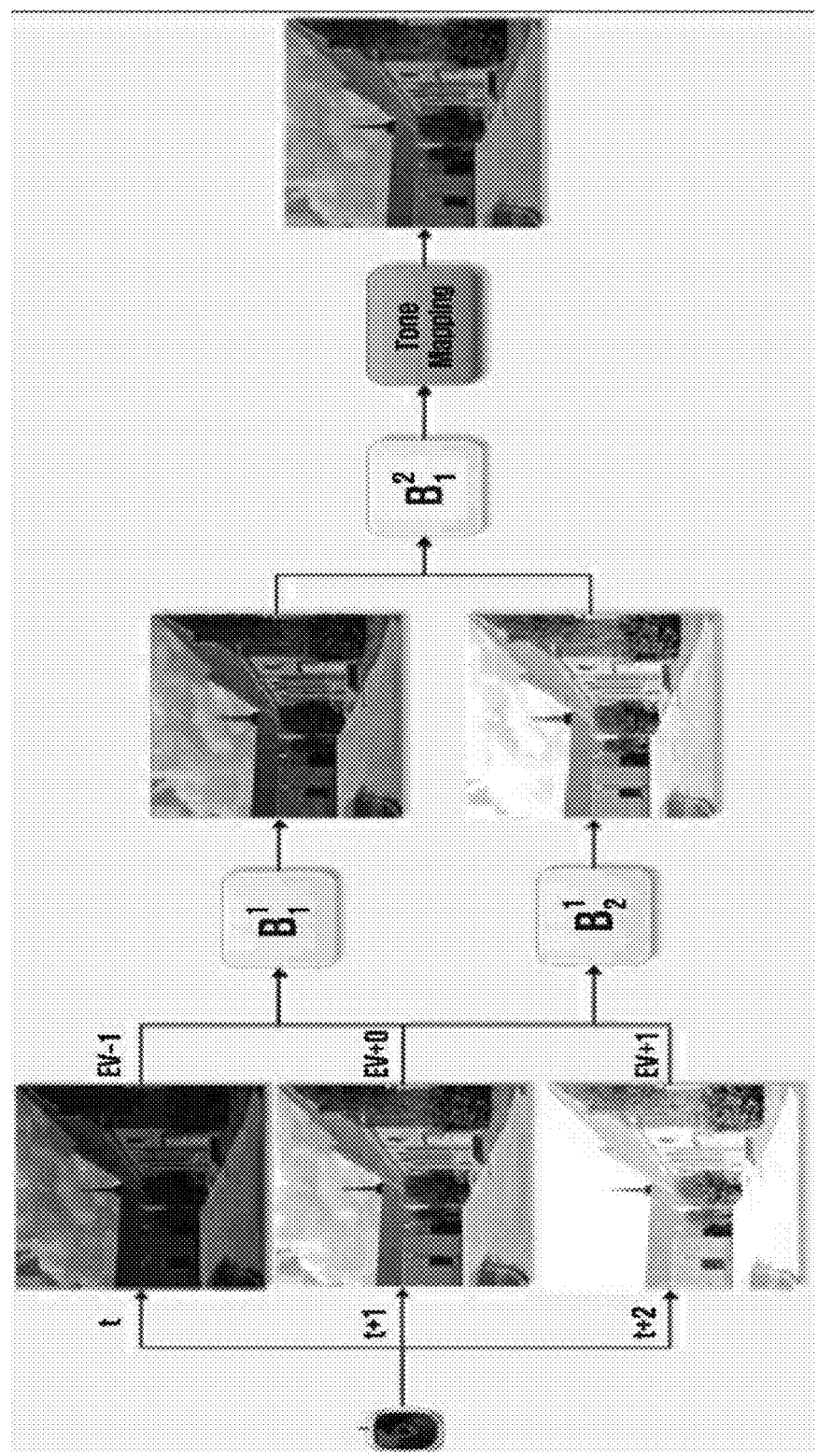
FIG. 8 illustrates a schematic diagram of an example scenario for generating high speed auto HDR image, according to embodiments as disclosed herein.

FIG. 8 illustrates a schematic diagram of an example scenario for generating high speed auto HDR image, according to embodiments as disclosed herein.

In an example, a triple exposure HDR image frame capture is captured by the electronic device 200. The multiple exposure image frames are captured at time instants for example, t, t+1, t+2, and so on. The successive image frames may be blended together that may progressively propagate to the next stage as depicted in FIG. 8. Further, tone Mapping is performed to generate the final HDR image output.

Figure 9A:
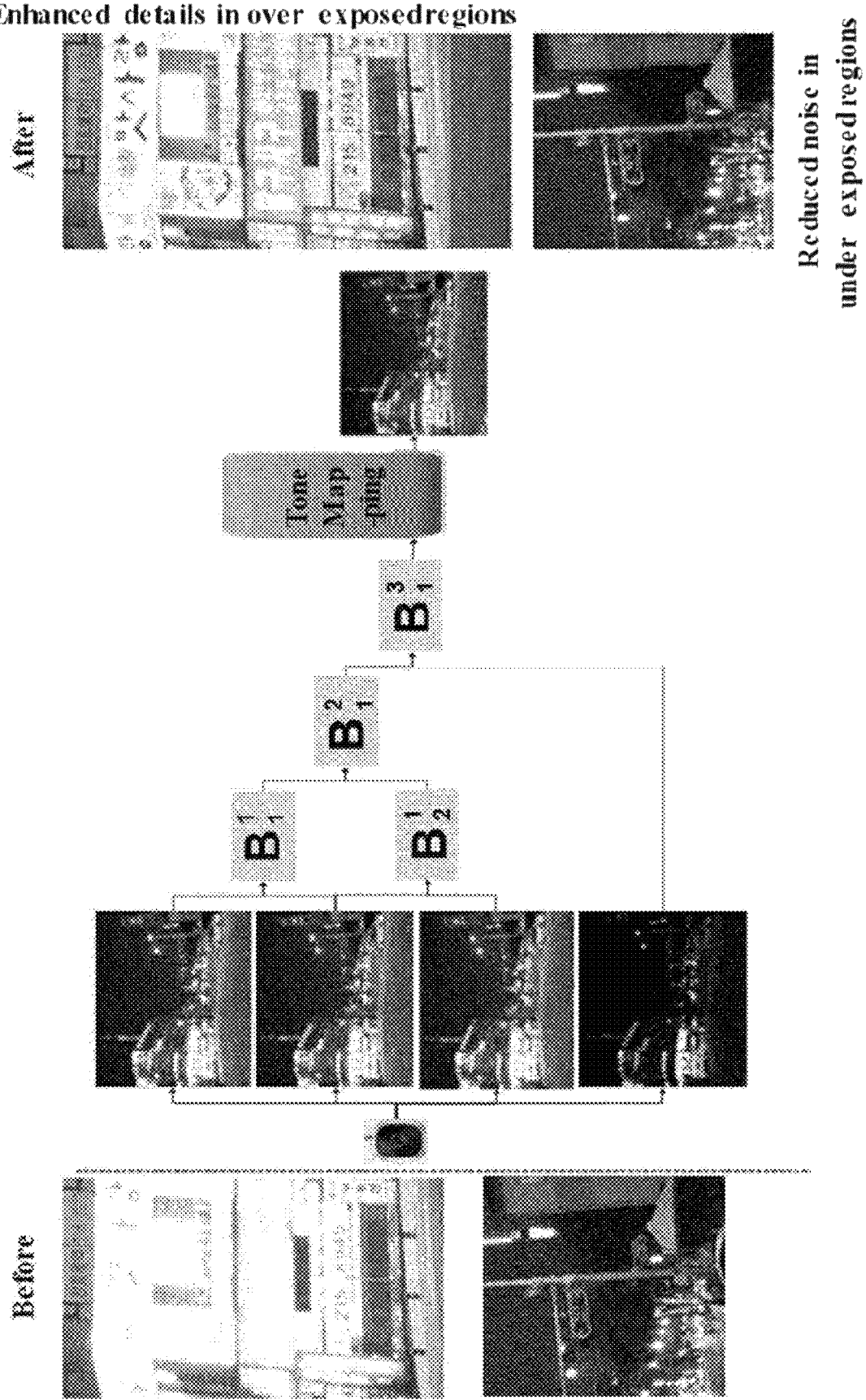
FIG. 9a illustrates a schematic diagram of an example scenario for generating low light de-noised HDR image, according to embodiments as disclosed herein.

FIG. 9a illustrates a schematic diagram of an example scenario for generating low light de-noised HDR image, according to embodiments as disclosed herein.

In an example, if the image comprises over exposed regions, then details in image may be enhanced using the basis HDR modules, as shown in FIG. 9a. Further, if the image comprises under exposed regions, then noise in the image is reduced, as shown in FIG. 9a.

Figure 9B:
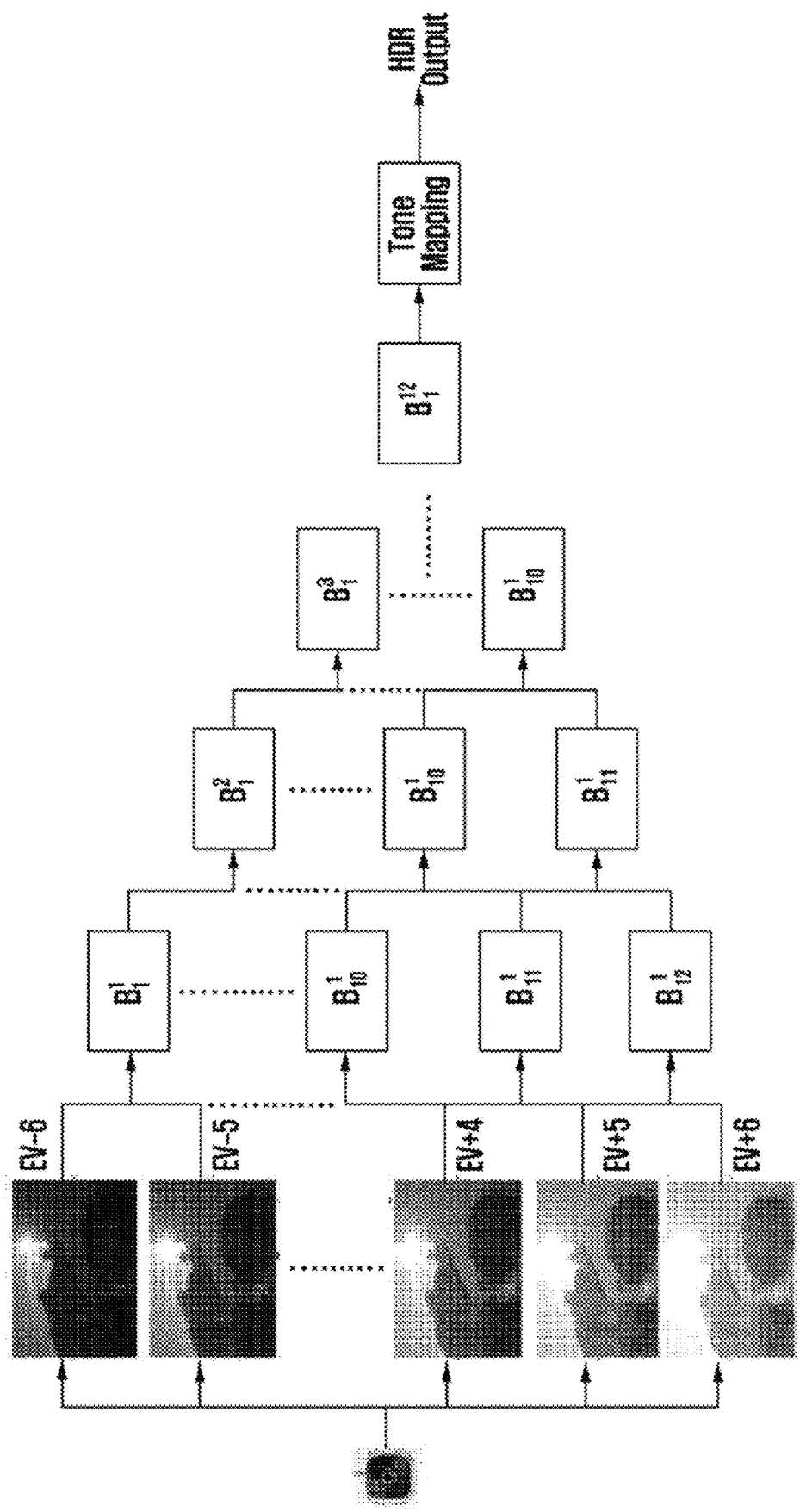
FIG. 9b illustrates a schematic diagram of an example scenario for generating massive HDR image, according to embodiments as disclosed herein.

FIG. 9b illustrates a schematic diagram of an example scenario for generating massive HDR image, according to embodiments as disclosed herein.

In an example, 13 frames may be used for multi exposure massive HDR image. The basis HDR modules may be scaled to produce massive HDR image and may ensures minimal ghosting artefacts with higher dynamic range.

Figure 9C:
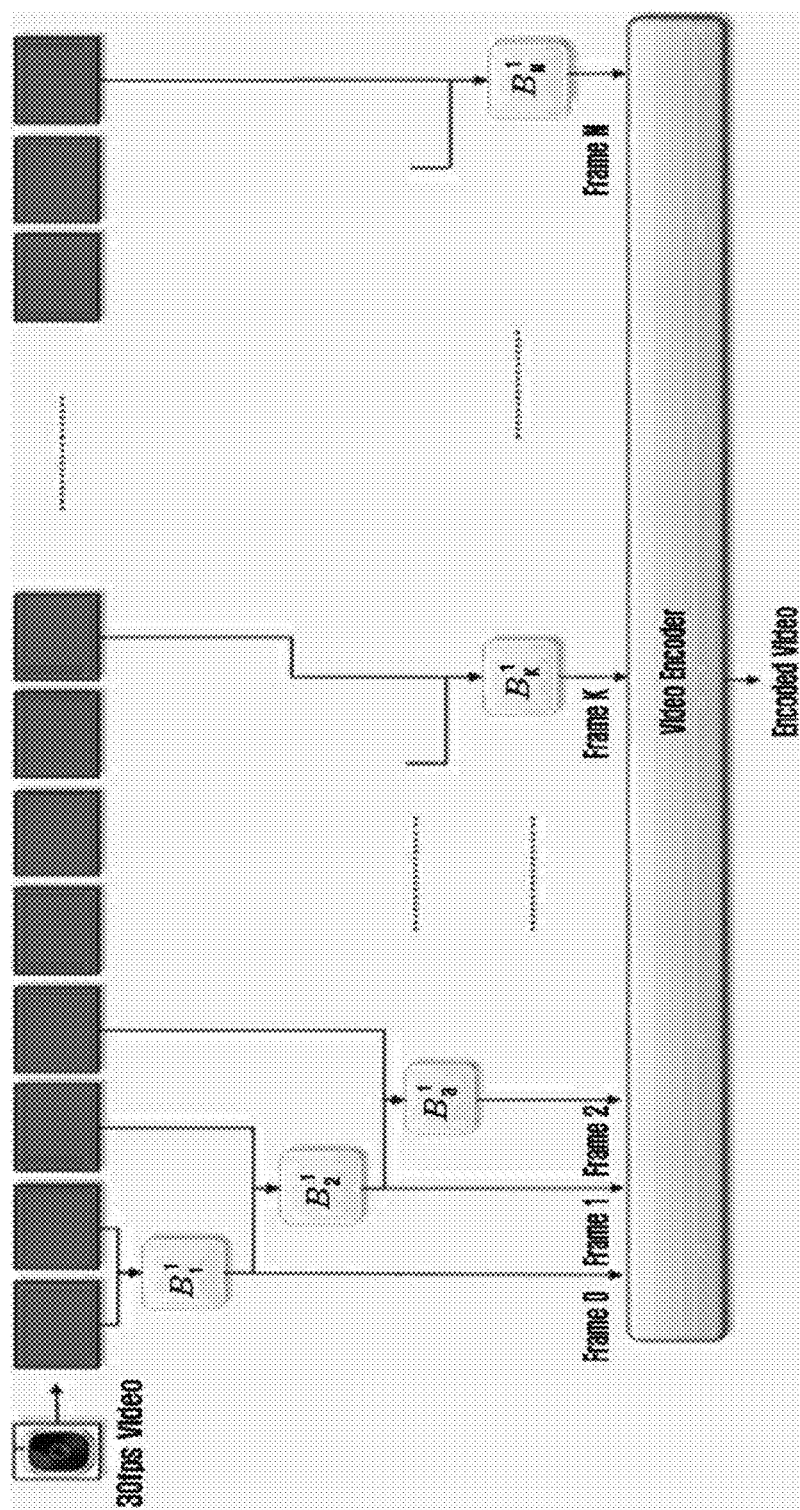
FIG. 9c illustrates a schematic diagram of an example scenario for recording HDR video, according to embodiments as disclosed herein.

FIG. 9c illustrates a schematic diagram of an example scenario for recording HDR video, according to embodiments as disclosed herein.

In an example, a high quality HDR video recording using multiple basis HDR modules are generated based on exposing alternate frames differently, to obtain a progressive high dynamic range video.

Figure 10A:
FIG. 10a is a schematic diagram of an example scenario of removed ghost artefacts in saturated regions of the captured image, according to embodiments as disclosed herein.

FIG. 10a is a schematic diagram of an example scenario of removed ghost artefacts in saturated regions of the captured image, according to embodiments as disclosed herein.

In an example, the true ghost artefacts such as hand motion of a human, sun light, vehicle motion, are eliminated in the generated HDR, as shown in the FIG. 10a.

Figure 10B:
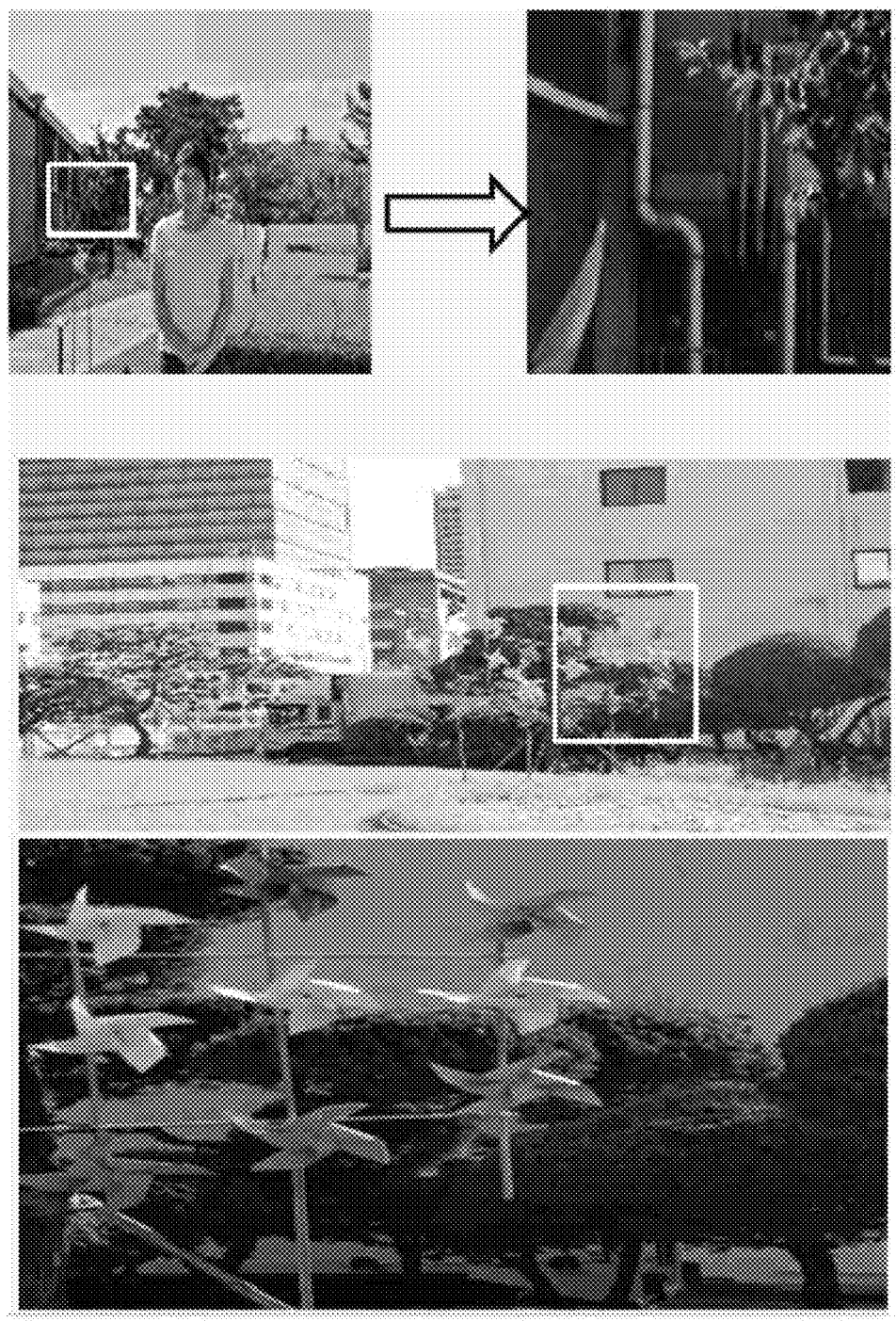
FIG. 10b is a schematic diagram of an example scenario of removed ghost artefacts in dark regions of the captured image, according to embodiments as disclosed herein.

FIG. 10b is a schematic diagram of an example scenario of removed ghost artefacts in dark regions of the captured image, according to embodiments as disclosed herein.

In an example, the images may include darker regions, and the darker regions are enhanced with higher exposure as shown in FIG. 10b. The details in the image are reproduced appropriately by basis HDR modules and the execution time for HDR image is comparatively reduced. For example, 4 frames may be executed in 650 milliseconds, 7 frames may be executed in 850 milliseconds, and 10 frames may be executed in 1200 milliseconds.

Figure 11A:
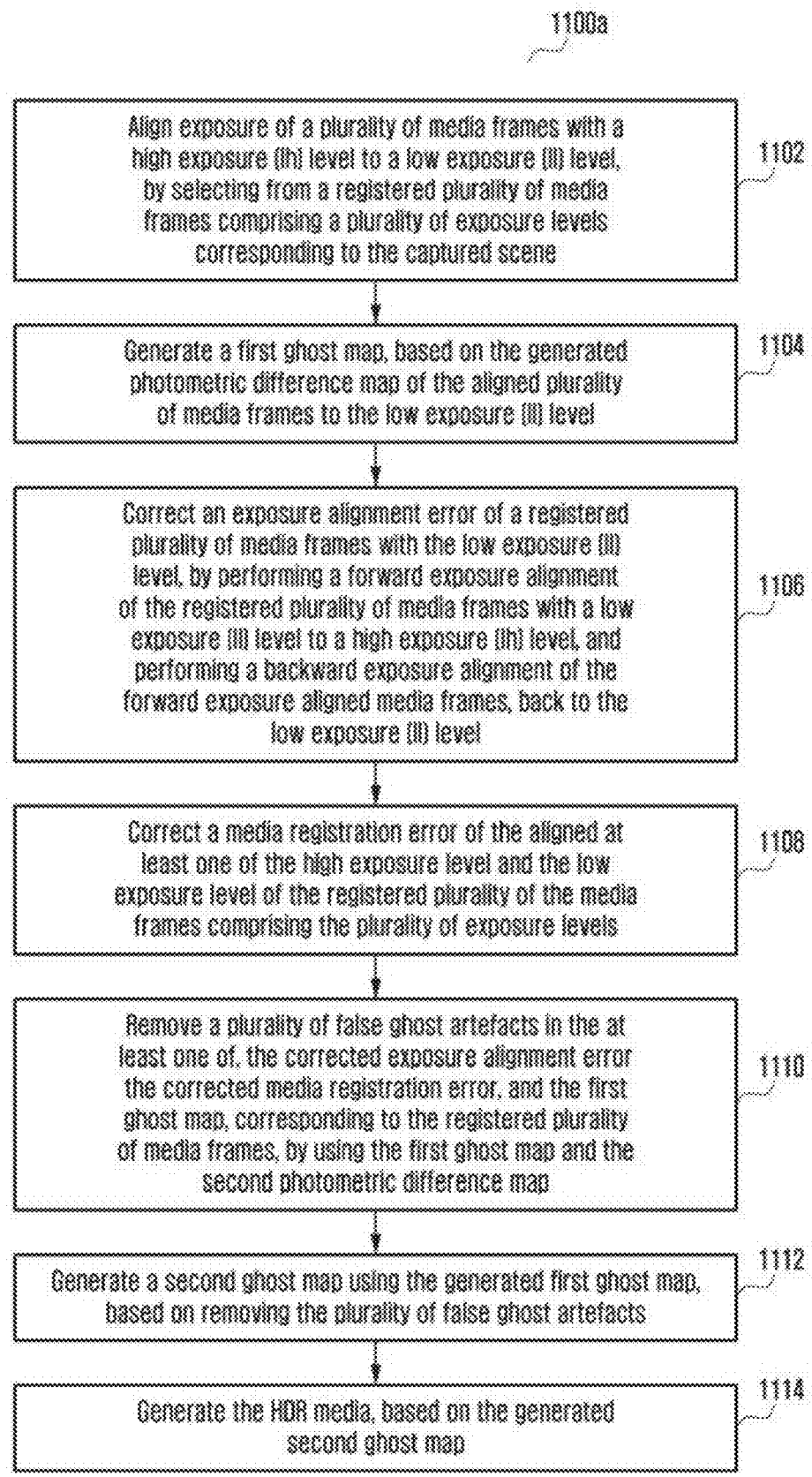
FIG. 11a is a flow chart depicting a method for generating a High Dynamic Range (HDR) media, based on the multi-stage compensation of motion in the captured scene, according to embodiments as disclosed herein.

FIG. 11a is a flow chart depicting a method 1100a for generating a High Dynamic Range (HDR) media, based on the multi-stage compensation of motion in the captured scene, according to embodiments as disclosed herein.

At step 1102, the method 1100a includes aligning an exposure of a plurality of media frames with a high exposure ($I_h$) level to a low exposure ($I_l$) level, by selecting from a registered plurality of media frames comprising a plurality of exposure levels corresponding to the captured scene. At step 1104, the method 1100a includes generating a first ghost map, based on the generated photometric difference map of the aligned plurality of media frames to the low exposure ($I_l$) level. At step 1106, the method 1100a includes correcting an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level. At step 1108, the method 1100a includes correcting a media registration error of the aligned at least one of the high exposure level and the low exposure level of the registered plurality of the media frames comprising the plurality of exposure levels. At step 1110, the method 1100a includes removing a plurality of false ghost artefacts in the at least one of, the corrected exposure alignment error the corrected media registration error, and the first ghost map, corresponding to the registered plurality of media frames, by using the first ghost map and the second photometric difference map. At step 1112, the method 1100a includes generating a second ghost map using the generated first ghost map, based on removing the plurality of false ghost artefacts. At step 1114, the method 1100a includes generating the HDR media, based on the generated second ghost map, wherein the HDR media is generated based on generating a weight map corresponding to the second ghost map associated with the corrected plurality of media frames and blending at least two corrected media frames using the weight maps.

The various actions in method 1100a may be performed in the order presented, in a different order or simultaneously. Further, in some embodiments, some actions listed in FIG. 11a may be omitted.

Figure 11B:
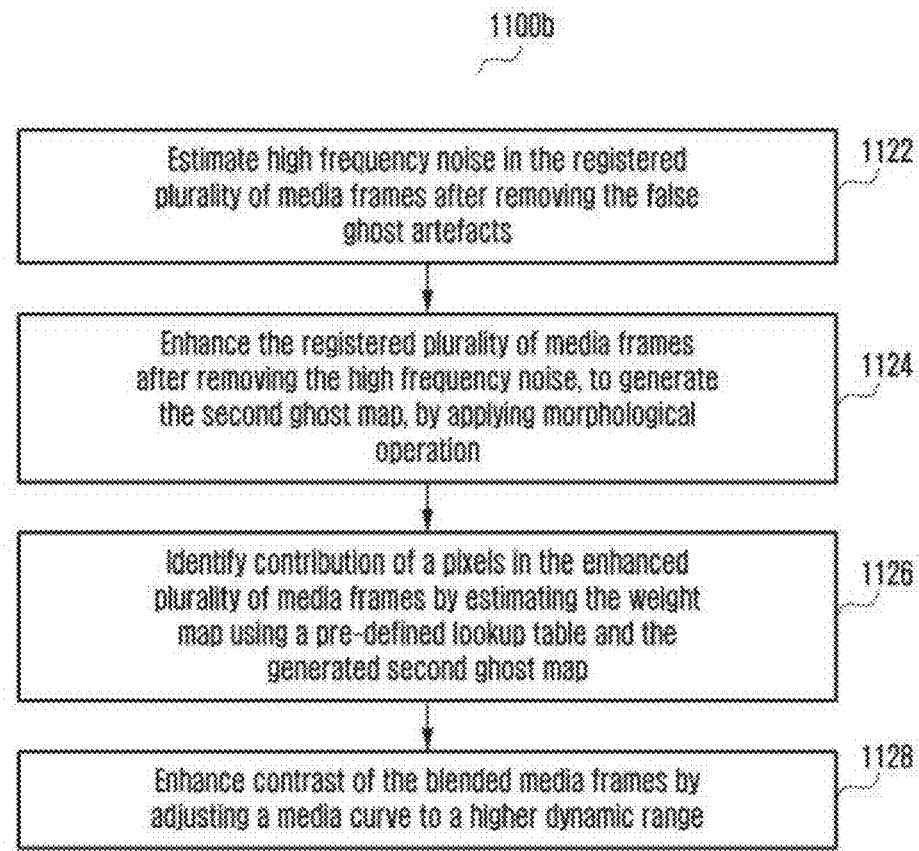
FIG. 11b is a flow chart depicting a method for enhancing contrast of the blended media frames by adjusting a media curve to a higher dynamic range, according to embodiments as disclosed herein.

FIG. 11b is a flow chart depicting a method 1100b for enhancing contrast of the blended media frames by adjusting a media curve to a higher dynamic range, according to embodiments as disclosed herein.

At step 1122, the method 1100b includes estimating high frequency noise in the registered plurality of media frames after removing the false ghost artefacts. At step 1124, the method 1100b includes enhancing the registered plurality of media frames after removing the high frequency noise, to generate the second ghost map, by applying morphological operation. At step 1126, the method 1100b includes identifying contribution of a pixels in the enhanced plurality of media frames by estimating the weight map using a pre-defined lookup table and the generated second ghost map. At step 1128, the method 1100b includes enhancing contrast of the blended media frames by adjusting a media curve to a higher dynamic range.

The various actions in method 1100b may be performed in the order presented, in a different order or simultaneously. Further, in some embodiments, some actions listed in FIG. 11b may be omitted.

Figure 11C:
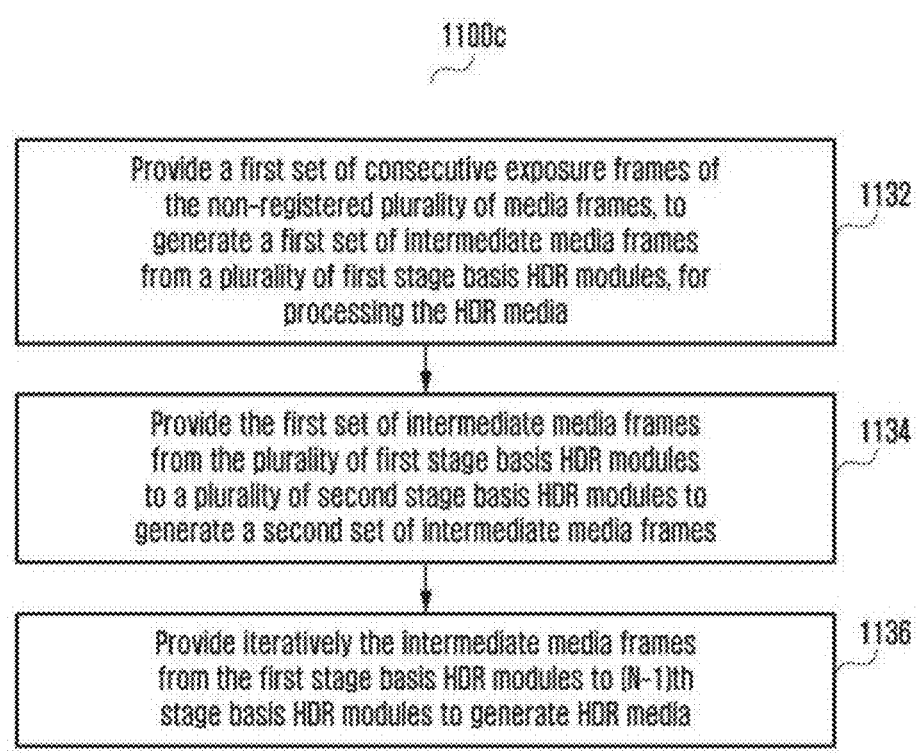
FIG. 11c is a flow chart depicting a method for providing iteratively the intermediate media frames from the first stage basis HDR modules to (N−1)th stage basis HDR modules, according to embodiments as disclosed herein.

FIG. 11c is a flow chart depicting a method 1100c for providing iteratively the intermediate media frames from the first stage basis HDR modules to (N−1)th stage basis HDR modules, according to embodiments as disclosed herein.

At step 1132, the method 1100c includes providing, first set of consecutive exposure frames of the non-registered plurality of media frames, to generate a first set of intermediate media frames from a plurality of first stage basis HDR modules, for processing the HDR media. At step 1134, the method 1100c includes providing the first set of intermediate media frames from the plurality of first stage basis HDR modules to a plurality of second stage basis HDR modules to generate a second set of intermediate media frames. At step 1136, the method 1100c includes providing iteratively the intermediate media frames from the first stage basis HDR modules to (N−1)th stage basis HDR modules to generate HDR media.

The various actions in method 1100c may be performed in the order presented, in a different order or simultaneously. Further, in some embodiments, some actions listed in FIG. 11c may be omitted.

Figure 11D:
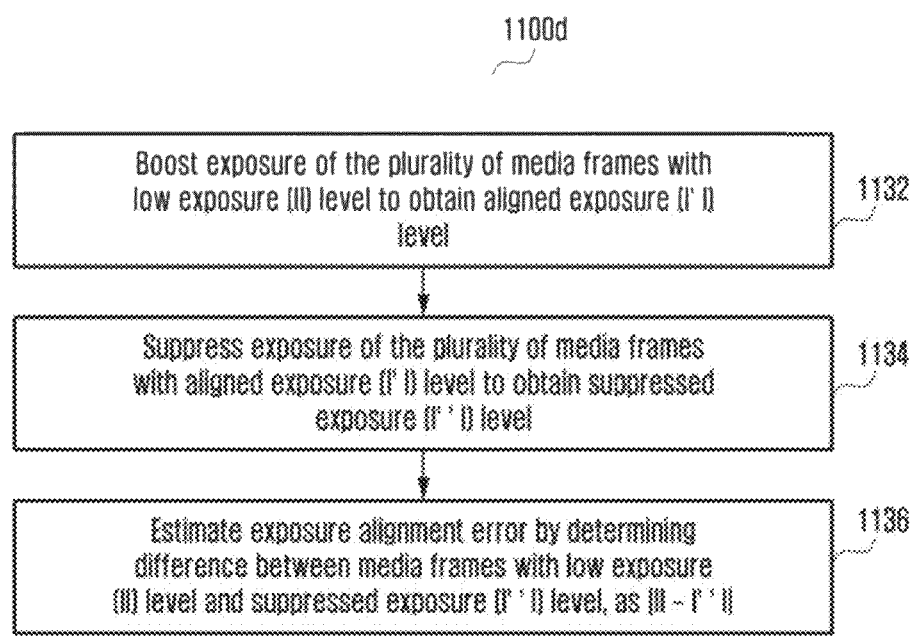
FIG. 11d is a flow chart depicting a method for estimating exposure alignment error, according to embodiments as disclosed herein.

FIG. 11d is a flow chart depicting a method 1100d for estimating exposure alignment error, according to embodiments as disclosed herein.

At step 1142, the method 1100d includes boosting exposure of the plurality of media frames with low exposure ($I_l$) level to obtain aligned exposure ($I'_l$) level. At step 1144, the method 1100d includes suppressing, by the processor (212), exposure of the plurality of media frames with aligned exposure ($I'_l$) level to obtain suppressed exposure ($I''_l$) level. At step 1146, the method 1100d includes estimating exposure alignment error by determining difference between media frames with low exposure ($I_l$) level and suppressed exposure ($I''_l$) level, as $|I_l - I''_l|$.

The various actions in method 1100d may be performed in the order presented, in a different order or simultaneously. Further, in some embodiments, some actions listed in FIG. 11d may be omitted.

The embodiments disclosed herein can be implemented through at least one software program running on at least one hardware device and performing network management functions to control the elements. The elements shown in FIGS. 2, 3, 4, 5 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. An apparatus (200) for generating a High Dynamic Range (HDR) media comprising:
   a processor (212); and
   a memory unit (202) coupled to the processor (212), wherein the memory unit (202) comprises a processing module (204) configured to:
   align exposure of a plurality of media frames with a high exposure ($I_h$) level to a low exposure ($I_l$) level, by selecting from a registered plurality of media frames comprising a plurality of exposure levels corresponding to the captured scene, wherein the registered plurality of media frames aligned to the low exposure ($I_l$) level is compared with a media frame of low exposure ($I_l$) level of a non-registered plurality of media frames comprising the plurality of exposure levels, to generate a first photometric difference map;
   generate a first ghost map, based on the generated photometric difference map of the aligned plurality of media frames to the low exposure ($I_l$) level;
   correct an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level, wherein the registered plurality of media frames aligned back to the low exposure ($I_l$) level is compared with the media frame of low exposure ($I_l$) level of the non-registered plurality of media frames comprising the plurality of exposure levels, to generate a second photometric difference map;
   correct a media registration error of the aligned at least one of the high exposure level and the low exposure level of the registered plurality of the media frames comprising the plurality of exposure levels;
   remove a plurality of false ghost artefacts in the at least one of, the corrected exposure alignment error the corrected media registration error, and the first ghost map, corresponding to the registered plurality of media frames, by using the first ghost map and the second photometric difference map;
   generate a second ghost map using the generated first ghost map, based on removing the plurality of false ghost artefacts; and generate the HDR media, based on the generated second ghost map, wherein the HDR media is generated based on generating a weight map corresponding to the second ghost map associated with the corrected plurality of media frames and blending at least two corrected media frames using the weight maps.

2. The apparatus (200) as claimed in claim 1, wherein the processing module (204) is further configured to:
estimate high frequency noise in the registered plurality of media frames after removing the false ghost artefacts;
enhance the registered plurality of media frames after removing the high frequency noise, to generate the second ghost map, by applying morphological operation;
identify contribution of a pixels in the enhanced plurality of media frames by estimating the weight map using a pre-defined lookup table and the generated second ghost map, wherein the weight maps are used to blend at least two corrected media frames; and
enhance contrast of the blended media frames by adjusting a media curve to a higher dynamic range.

3. The apparatus (200) as claimed in claim 1, wherein the processing module (204) is further configured to:
provide a first set of consecutive exposure frames of the non-registered plurality of media frames, to generate a first set of intermediate media frames from a plurality of first stage basis HDR modules, for processing the HDR media;
provide the first set of intermediate media frames from the plurality of first stage basis HDR modules to a plurality of second stage basis HDR modules to generate a second set of intermediate media frames; and
provide iteratively the intermediate media frames from the first stage basis HDR modules to (N−1)th stage basis HDR modules to generate HDR media.

4. The apparatus (200) as claimed in claim 1, wherein the processing module (204) is further configured to:
boost exposure of the plurality of media frames with low exposure ($I_l$) level to obtain aligned exposure ($I'_l$) level;
suppress exposure of the plurality of media frames with aligned exposure ($I'_l$) level to obtain suppressed exposure ($I''_l$) level; and
estimate exposure alignment error by determining difference between media frames with low exposure ($I_l$) level and suppressed exposure ($I''_l$) level, as $|I_l - I''_l|$.

5. The apparatus (200) as claimed in claim 1, wherein the exposure alignment of the media frame is performed by using histogram matching method (exposure alignment), wherein aligning exposure of the plurality of media frames with the high exposure ($I_h$) level to the low exposure ($I_l$) level is performed by polynomial fitting method.

6. The apparatus (200) as claimed in claim 1, wherein correcting the media registration error comprises analyzing edge information of the aligned at least one of the high exposure level and the low exposure level of the registered plurality of the media frames.

7. The apparatus (200) as claimed in claim 3, wherein the basis HDR modules are connected each other in series, to operate on media frames that are captured consecutively, to remove ghost and halo artefacts, wherein the basis HDR modules comprises enhancing dynamic rage of the media frames in multiple stage basis HDR modules, wherein the basis HDR modules comprises tone mapping of the final HDR media suitable for display on a display unit (210) and image compression stage of the apparatus (200).

8. A method (1100a) for generating a High Dynamic Range (HDR) media, comprising:
aligning, by a processor (212), an exposure of a plurality of media frames with a high exposure ($I_h$) level to a low exposure ($I_l$) level, by selecting from a registered plurality of media frames comprising a plurality of exposure levels corresponding to the captured scene, wherein the registered plurality of media frames aligned to the low exposure ($I_l$) level is compared with a media frame of low exposure ($I_l$) level of a non-registered plurality of media frames comprising the plurality of exposure levels, to generate a first photometric difference map;
generating, by the processor (212), a first ghost map, based on the generated photometric difference map of the aligned plurality of media frames to the low exposure ($I_l$) level;
correcting, by the processor (212), an exposure alignment error of a registered plurality of media frames with the low exposure ($I_l$) level, by performing a forward exposure alignment of the registered plurality of media frames with a low exposure ($I_l$) level to a high exposure ($I_h$) level, and performing a backward exposure alignment of the forward exposure aligned media frames, back to the low exposure ($I_l$) level, wherein the registered plurality of media frames aligned back to the low exposure ($I_l$) level is compared with the media frame of low exposure ($I_l$) level of the non-registered plurality of media frames comprising the plurality of exposure levels, to generate a second photometric difference map;
correcting, by the processor (212), a media registration error of the aligned at least one of the high exposure level and the low exposure level of the registered plurality of the media frames comprising the plurality of exposure levels;
removing, by the processor (212), a plurality of false ghost artefacts in the at least one of, the corrected exposure alignment error the corrected media registration error, and the first ghost map, corresponding to the registered plurality of media frames, by using the first ghost map and the second photometric difference map;
generating, by the processor (212), a second ghost map using the generated first ghost map, based on removing the plurality of false ghost artefacts; and
generating, by the processor (212), the HDR media, based on the generated second ghost map, wherein the HDR media is generated based on generating a weight map corresponding to the second ghost map associated with the corrected plurality of media frames and blending at least two corrected media frames using the weight maps.

9. The method (1100a) as claimed in claim 8, the method (1100b) further comprises:
estimating, by the processor (212), high frequency noise in the registered plurality of media frames after removing the false ghost artefacts;
enhancing, by the processor (212), the registered plurality of media frames after removing the high frequency noise, to generate the second ghost map, by applying morphological operation;
identifying, by the processor (212), contribution of a pixels in the enhanced plurality of media frames by estimating the weight map using a pre-defined lookup table and the generated second ghost map, wherein the weight maps are used to blend at least two corrected media frames; and enhancing, by the processor (212), contrast of the blended media frames by adjusting a media curve to a higher dynamic range.

10. The method (200) as claimed in claim 8, the method (1100c) further comprises:
providing, by the processor (212), a first set of consecutive exposure frames of the non-registered plurality of media frames, to generate a first set of intermediate media frames from a plurality of first stage basis HDR modules, for processing the HDR media;
providing, by the processor (212), the first set of intermediate media frames from the plurality of first stage basis HDR modules to a plurality of second stage basis HDR modules to generate a second set of intermediate media frames; and
providing, by the processor (212), iteratively the intermediate media frames from the first stage basis HDR modules to (N−1)th stage basis HDR modules to generate HDR media.

11. The method (1100a) as claimed in claim 8, the method (1100d) further comprises:
boosting, by the processor (212), exposure of the plurality of media frames with low exposure ($I_l$) level to obtain aligned exposure ($I'_l$) level;
suppressing, by the processor (212), exposure of the plurality of media frames with aligned exposure ($I'_l$) level to obtain suppressed exposure ($I''_l$) level; and
estimating, by the processor (212), exposure alignment error by determining difference between media frames with low exposure ($I_l$) level and suppressed exposure ($I''_l$) level, as $|I_l - I''_l|$.

12. The method (1100a) as claimed in claim 8, wherein the exposure alignment of the media frame is performed by using histogram matching method (exposure alignment).

13. The method (1100a) as claimed in claim 8, wherein aligning exposure of the plurality of media frames with the high exposure ($I_h$) level to the low exposure ($I_l$) level is performed by polynomial fitting method.

14. The method (1100a) as claimed in claim 8, wherein correcting the media registration error comprises analyzing edge information of the aligned at least one of the high exposure level and the low exposure level of the registered plurality of the media frames.

15. The method (1100c) as claimed in claim 10, wherein the basis HDR modules are connected each other in series, to operate on media frames that are captured consecutively, to remove ghost and halo artefacts,
wherein the basis HDR modules comprises enhancing dynamic rage of the media frames in multiple stage basis HDR modules, wherein the basis HDR modules comprises tone mapping of the final HDR media suitable for display on a display unit (210) and image compression stage of the apparatus (200).

* * * * *